(12) United States Patent
Mitsunami et al.

(10) Patent No.: US 9,940,691 B2
(45) Date of Patent: Apr. 10, 2018

(54) INFORMATION PROCESSING APPARATUS, CONTROL METHOD OF THE SAME, AND VIDEO CAMERA

(71) Applicant: CANON KABUSHIKI KAISHA, Tokyo (JP)

(72) Inventors: Koki Mitsunami, Yokohama (JP); Tadayoshi Nakayama, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 42 days.

(21) Appl. No.: 14/986,858

(22) Filed: Jan. 4, 2016

(65) Prior Publication Data

US 2016/0196634 A1 Jul. 7, 2016

(30) Foreign Application Priority Data

Jan. 7, 2015 (JP) .................................. 2015-001886

(51) Int. Cl.
  *H04N 5/235* (2006.01)
  *G06T 3/00* (2006.01)
  *H04N 5/225* (2006.01)
(52) U.S. Cl.
  CPC ........... *G06T 3/0056* (2013.01); *H04N 5/225* (2013.01)

(58) Field of Classification Search
  None
  See application file for complete search history.

(56) References Cited

U.S. PATENT DOCUMENTS

2015/0355885 A1  12/2015  Nakayama et al.

OTHER PUBLICATIONS

Heckbert, "Fundamentals of Texture Mapping and Image Warping", Master Thesis, Department of Electrical Engineering and Computer Science, University of California, Berkeley, Jun. 1989, pp. 1-89.

*Primary Examiner* — Stephen Coleman
(74) *Attorney, Agent, or Firm* — Carter, DeLuca, Farrell & Schmidt, LLP

(57) ABSTRACT

When deducing a homography matrix representing a geometrical relationship between two images, an image processing apparatus obtains a transformation matrix for four feature points in each of the two images based on reference coordinates. More specifically, the apparatus obtains the area of a triangle formed by three out of the four feature points, and calculates projective parameters of transformation matrices from the area ratios. The apparatus calculates the homography matrix between the images by the product of one of the two obtained matrices and an inverse matrix of the other.

8 Claims, 8 Drawing Sheets

INFORMATION PROCESSING APPARATUS, CONTROL METHOD OF THE SAME, AND VIDEO CAMERA

BACKGROUND OF THE INVENTION

Field of the Invention

The present invention relates to an arithmetic technique for a coordinate transformation matrix for transforming two-dimensional or three-dimensional coordinate data into two two-dimensional coordinate data.

Description of the Related Art

Projective transformation includes homography transformation which is transformation from a two-dimensional space to a two-dimensional space, and transformation from a three-dimensional space to a three-dimensional space. Calculating a homography transformation matrix or three-dimensional projective transformation matrix from coordinate data of corresponding points in two spaces is basic processing in computer vision. These matrices can be used in various applications such as the generation of a panoramic image, the correction of a projection position of a projector, camera calibration using a planar pattern, the deduction and restoration of a three-dimensional shape of an object, and the detection of an obstacle on a road surface.

The principle of a vibration-proofing function of a moving image camera, which is implemented by using the homography matrix, and a method of obtaining the homography matrix will be explained below, and the problems will be described after that.

Blurring between consecutive frames obtained by capturing a moving image is detected as a geometric transform matrix, and the image is reversely corrected by a matrix obtained by smoothing the geometric transform matrix over ten-odd frames. This makes it possible to smooth blurring between the frames, and implement a vibration-proofing function when capturing a moving image.

When the distance from a camera to an object is sufficiently long and no problem arises even if the individual points of interest of the object are regarded as existing on the same plane, a geometric transform matrix expressing blurring between frames can be represented by a homography matrix, and the coordinates of pixels in these frames can be associated with each other by:

$$\lambda \begin{bmatrix} x_1 \\ y_1 \\ 1 \end{bmatrix} = \begin{bmatrix} a & b & c \\ d & e & f \\ g & h & 1 \end{bmatrix} \begin{bmatrix} u_1 \\ v_1 \\ 1 \end{bmatrix} \quad (1)$$

$$\lambda = gu_1 + hv_1 + 1$$

In equation (1), a 3×3 matrix on the right-hand side is a homography matrix, and a pixel having coordinates (u, v) in the preceding frame is converted into coordinates (x, y). Also, equation (1) can express non-linear projective transformation by a linear arithmetic operation by using homogeneous coordinates.

When the ninth element in the lower right corner of the 3×3 matrix of equation (1) is set at 1 as standardization, eight other elements can take free values, and a matrix having a degree of freedom of 8 is obtained. On the other hand, when coordinates in two images represented by the relationship of equation (1) are developed, two equations indicated by equation (2) below are obtained:

$$(gu_1+hv_1+1)x_1 = au_1+bv_1+c$$

$$(gu_1+hv_1+1)y_1 = du_1+ev_1+f \quad (2)$$

Eight equations, that is, simultaneous equations with eight unknowns can be obtained from four pairs of corresponding points, and one homography matrix can be obtained by solving these simultaneous equations. It is, however, assumed that three arbitrary points of these four coordinate points do not exist on a straight line.

By using the method as described above, homography matrices are obtained for a combination of four feature points in images and evaluated, and a matrix having the best evaluation result is selected and used as a homography matrix representing the relationship between the images. A deduction method like this is known as RANSAC deduction. To obtain a highly evaluated matrix, it is necessary to obtain and evaluate homography matrices for as many feature point combinations as possible, and the number is a few hundred to a few thousand per image.

A Gauss iteration method and Gauss-Jordan iteration method are well known as methods of solving the above-mentioned simultaneous equations. However, the operation amount is large, and an operation error on numerical calculations sometimes increases. A method called pivot is, of course, usable as a measure to eliminate these inconveniences, but the processing amount further increases if this method is executed.

A literature "Paul S. Heckbert, "Fundamentals of Texture Mapping and Image Warping", Master Thesis, Department of Electrical Engineering and Computer Science, University of California, Berkeley, June, 1989" describes a method of deducing a homography matrix between images by an approach entirely different from the aforementioned method. The method disclosed in this literature will briefly be explained below.

When deducing a homography matrix from image 1 to image 2, a unit square is defined in a space different from these images. Then, a first homography matrix H1 from this unit square to image 1 and a second homography matrix H2 from the unit square to image 2 are deduced. After that, an inverse matrix H1$^{-1}$ of the first homography matrix H1 is multiplied by the second homography matrix H2, and H2·H1$^{-1}$ is calculated as a homography matrix from image 1 to image 2.

This method requires the processes of deducing two homography matrices, calculating an inverse matrix of one homography matrix, and multiplying the inverse matrix of the one homography matrix by the other homography matrix.

In an application like a vibration-proofing function of an imaging apparatus such as a video camera, hundreds to thousands of feature points are extracted from one frame, and corresponding points are searched for between frames. Then, as many homography matrices as possible are deduced and calculated for various combinations of the corresponding points within one frame time. Consequently, a homography matrix having a higher evaluation can be obtained. Therefore, each matrix deduction must be performed at high speed. Also, matrix deduction can be performed for more feature point combinations by aborting the matrix deducing process if four feature points have linearity. To do that, however, a linearity determining process must be added to the existing matrix deducing process.

SUMMARY OF THE INVENTION

The present invention has been made in consideration of the above problems. According to an aspect of the present invention, there is provided an information processing apparatus comprising: an area calculator configured to calculate, in each of a first plane and a second plane, an area of a triangle whose apexes are three feature points of four feature points; a first matrix calculator configured to calculate, in each of the first plane and the second plane, a first transformation matrix and a second transformation matrix for transforming four reference feature points into the four feature points, by using the area of the triangle whose apexes are three feature points of the four feature points; and a second matrix calculator configured to calculate a third transformation matrix for transforming the four feature points of the first plane into the four feature points of the second plane, by using the first transformation matrix and the second transformation matrix.

According to the present invention, it is possible to rapidly obtain a projective transformation matrix from an n-dimensional (n=2 or 3) first space to an n-dimensional second space.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Embodiments according to the present invention will be explained in detail below with reference to the accompanying drawings. As will be explained in detail below, the embodiments disclose an information processing apparatus which deduces a projective transformation matrix from feature points in an n-dimensional (n=2 or 3) first space to feature points in an n-dimensional second space. More specifically, this apparatus calculates, for each of the first and second spaces, (n+1) types of areas or volumes formed by n+1 out of (n+2) feature points in an n-dimensional space, and calculates, for each of the first and second spaces, first n parameters from the ratios of the areas or volumes. Then, the apparatus extracts, for each of the first and second spaces, second parameters which associate reference coordinates and feature point coordinates in the first and second spaces with each other. After that, the apparatus generates a projective transformation matrix from the first space to the second space, based on the first n parameters and second parameters.

First Embodiment

Figure 8:
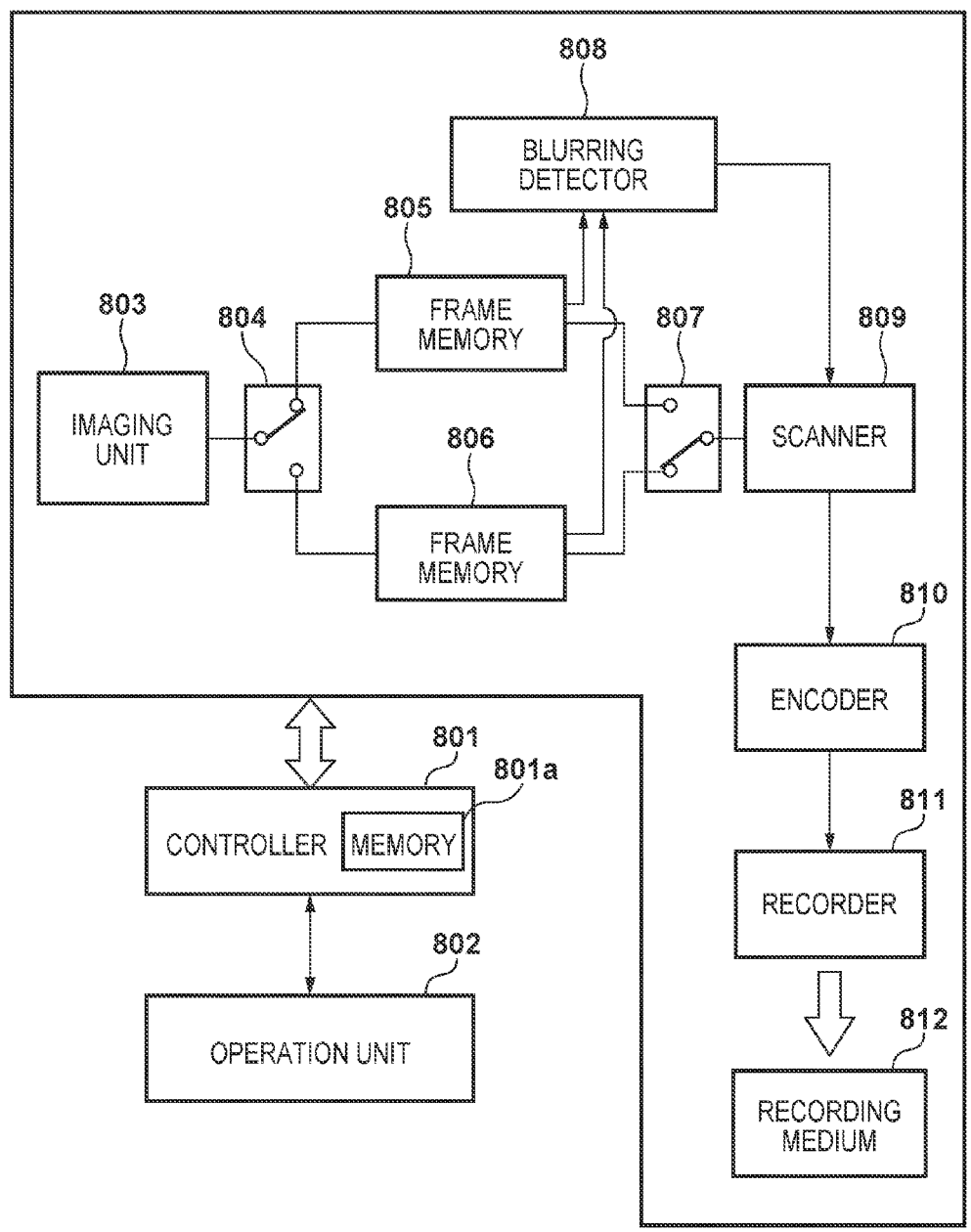
FIG. 8 is a block diagram of a video camera to which the embodiments are applied.

An example in which the present invention is applied to a video camera having a vibration-proofing function as an information processing apparatus for deducing a homography matrix will be explained below. FIG. 8 is a block diagram of main portions of the video camera according to the embodiment. The constituent elements and their functions will be explained below with reference to FIG. 8.

A controller 801 controls the whole apparatus, and includes a processor such as a CPU. The controller 801 also includes a memory 801a storing procedures (programs). An operation unit 802 for accepting instructions from an operator is connected to the controller 801. An imaging unit 803 includes an optical lens and imaging element, acquires, for example, image data of 30 frames per 1 sec, and alternately stores frame images one by one in frame memories 805 and 806 via a switch 804. As a consequence, the frame memories 805 and 806 hold two temporally consecutive frame images. A blurring detector 808 detects a blurring amount by deducing a homography transformation matrix from the images of the two consecutive frames (a preceding frame and succeeding frame) stored in the frame memories 805 and 806. Then, the blurring detector 808 determines a scan order based on the deduced homography transformation matrix, and provides the information to a scanner 809. A switch 807 connects one of the frame memories 805 and 806, which stores the succeeding frame image, to the scanner 809. Based on the information from the blurring detector 808, the scanner 809 reads out image data from the frame memory selected by the switch 807, and outputs a frame image whose blurring amount is canceled (an image having undergone blurring correction) to an encoder 810. The encoder 810 encodes the frame image output from the scanner 809, and outputs the encoded data to a recorder 811. The recorder 811 records the encoded data as a moving image file in a storage medium 812 such as a memory card (e.g., an SD card). The blurring detector 808, scanner 809, encoder 810, and recorder 811 may be independent circuits, and may also be implemented by the same processor as the controller 801 by executing different procedures (programs) stored in the memory 801a.

The homography transformation matrix deducing process performed by the blurring detector 808 according to the above embodiment will be explained below. This embodiment is directed to a process of deducing a homography matrix from an image to an image based on corresponding feature points in these images, and a process of deducing a projective transformation matrix from three dimensions to three dimensions based on corresponding feature points in spaces. Note that in the following explanation, a temporally preceding frame image of two consecutive frame images will be expressed as image 1, and a temporally succeeding frame image will be expressed as image 2.

Figure 1:
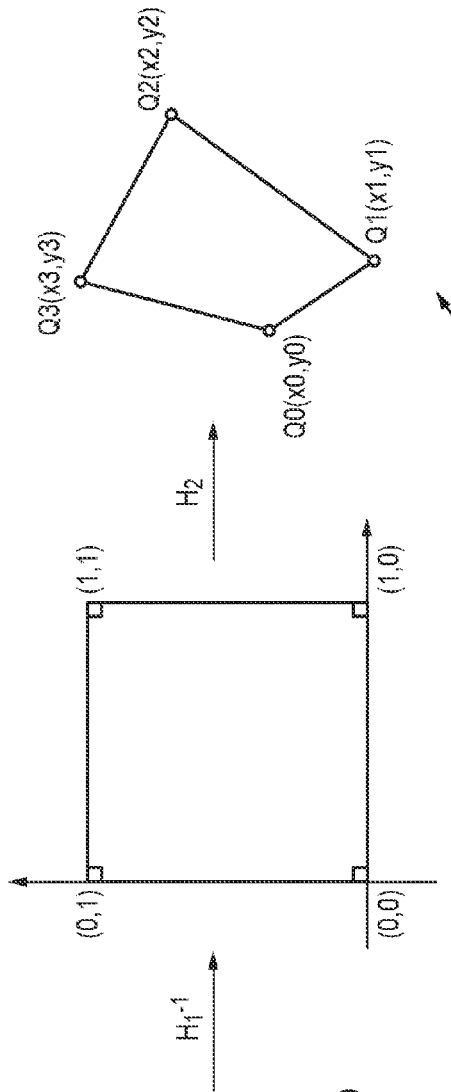
FIG. 1 is a view showing four feature points in image 1, and reference coordinates and four feature points in image 2 to be associated with the four feature points in image 1.

Details of a process of deducing a homography matrix $H_{21}$ from four feature point coordinates P0, P1, P2, and P3 in image 1 to four feature point coordinates Q0, Q1, Q2, and Q3 in image 2, which correspond to the feature point coordinates P0, P1, P2, and P3, shown in FIG. 1 will be explained below.

First, the relationship between decomposition of the homography matrix $M_{21}$ and decomposed matrices $H_1^{-1}$ and $H_2$ according to this embodiment will be explained. As for mapping from feature points in image 1 represented by the homography matrix $H_{21}$ to feature points in image 2, the presence of reference coordinates of a unit square between them will be described below. In this state, the homography matrix $H_{21}$ can be decomposed into a homography matrix $H_1^{-1}$ representing mapping from the feature points in image 1 to the unit square, and a homography matrix $H_2$ representing mapping from the unit square to the feature points in image 2, as indicated by equation (3) below. Decomposition like this can simplify the deduction of each matrix and the calculation of an inverse matrix, when compared to a process of directly obtaining the homography matrix $H_{21}$ as will be described later. Note that the homography matrix $H_1^{-1}$ is an inverse matrix of a homography matrix $H_1$ representing mapping from the unit square to the feature points in image 1.

$$H_{21} = H_1^{-1} H_2 \quad (3)$$

Figure 2:
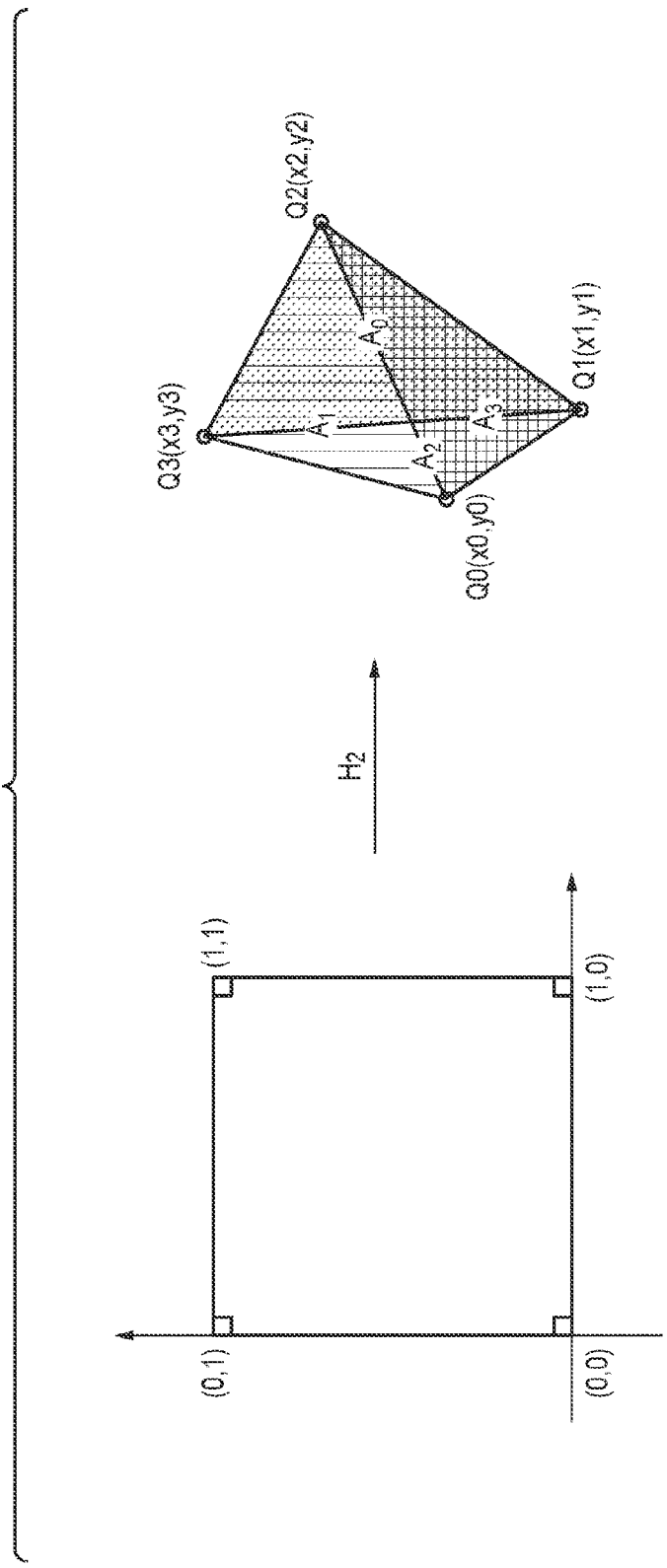
FIG. 2 is a view showing mapping from a unit square of the reference coordinates to the feature points in image 2, and four triangles formed by three out of the fourth feature points in image 2.

First, therefore, the calculation of the homography matrix $H_2$ representing mapping from the unit square of the reference coordinates to the feature points in image 2 as shown in FIG. 2 will be explained. Simultaneous equations with eight unknowns for obtaining the homography matrix $H_2$ are as indicated by equation (4) below, and the relational expression of the homography matrix $H_2$ obtained therefrom is indicated by equation (5) below:

$$\begin{bmatrix} 0 & 0 & 1 & 0 & 0 & 0 & 0 & 0 \\ 1 & 0 & 1 & 0 & 0 & 0 & -x_1 & 0 \\ 1 & 1 & 1 & 0 & 0 & 0 & -x_2 & -x_2 \\ 0 & 1 & 1 & 0 & 0 & 0 & 0 & -x_3 \\ 0 & 0 & 0 & 0 & 0 & 1 & 0 & 0 \\ 0 & 0 & 0 & 1 & 0 & 1 & -y_1 & 0 \\ 0 & 0 & 0 & 1 & 1 & 1 & -y_2 & -y_2 \\ 0 & 0 & 0 & 0 & 1 & 1 & 0 & -y_3 \end{bmatrix} \begin{bmatrix} a \\ b \\ c \\ d \\ e \\ f \\ g \\ h \end{bmatrix} = \begin{bmatrix} x_0 \\ x_1 \\ x_2 \\ x_3 \\ y_0 \\ y_1 \\ y_2 \\ y_3 \end{bmatrix} \quad (4)$$

$$c = x_0 \quad (5)$$
$$a + c = (g+1)x_1$$
$$b + c = (h+1)x_3$$
$$a + b + c = (g+1)x_2 + (h+1)x_2 - x_2$$
$$f = y_0$$
$$d + f = (g+1)y_1$$
$$e + f = (h+1)y_3$$
$$d + e + f = (g+1)y_2 + (h+1)y_2 - y_2$$
$$(g+1)(x_1 - x_2) + (h+1)(x_3 - x_2) = (x_0 - x_2)$$
$$(g+1)(y_1 - y_2) + (h+1)(y_3 - y_2) = (y_0 - y_2)$$

The greatest feature of the homography matrix deducing process according to this embodiment is that when calculating parameters by using equation (5), parameters g and h are not directly calculated, but geometrically significant parameters (g+1) and (h+1) are calculated.

The values of the parameters (g+1) and (h+1) are obtained by the last two equations of equation (5), and indicated by equation (6). The numerator and denominator of each parameter perform an outer product operation of a position vector of each coordinate whose origin is a feature point ($x_2$, $Y_2$).

Also, assuming that the area of a triangle formed by three points, that is, point 1, point 2, and point 3 is expressed by "Δpoint1point2point3", the abovementioned parameters can also be calculated as area ratios $\Delta Q0Q2Q3/\Delta Q1Q2Q3$ and $\Delta Q1Q2Q0/\Delta Q1Q2Q3$ of triangles formed by the feature points.

$$g + 1 = \frac{\begin{vmatrix} x_0 - x_2 & x_3 - x_2 \\ y_0 - y_2 & y_3 - y_2 \end{vmatrix}}{\begin{vmatrix} x_1 - x_2 & x_3 - x_2 \\ y_1 - y_2 & y_3 - y_2 \end{vmatrix}} = \frac{\Delta Q0Q2Q3}{\Delta Q1Q2Q3} \quad (6)$$

$$h + 1 = \frac{\begin{vmatrix} x_1 - x_2 & x_0 - x_2 \\ y_1 - y_2 & y_0 - y_2 \end{vmatrix}}{\begin{vmatrix} x_1 - x_2 & x_3 - x_2 \\ y_1 - y_2 & y_3 - y_2 \end{vmatrix}} = \frac{\Delta Q1Q2Q0}{\Delta Q1Q2Q3}$$

The calculations of the parameters (g+1) and (h+1) make it possible to simplify the arithmetic operations, and reduce the operation amount of the calculation process.

Furthermore, the areas of the above triangles can also be calculated from the outer product of adjacent side vectors of a square formed by four feature points. This makes an arithmetic operation suited to hardware processing possible. This will briefly be explained below.

First, coordinate data (x0, y0), (x1, y1), (x2, y2), (x3, y3), and (x0, y0) of feature points are input in order. In the first stage, the differences between adjacent coordinates are calculated, thereby generating four consecutive side vectors. In the second stage, the outer product of two consecutive side vectors is calculated.

Consequently, the areas are calculated in the order of ΔQ0Q1Q2, ΔQ1Q2Q3, and ΔQ2Q3Q0. The value is twice the area of the triangle to be exact, but this can be ignored because it is removed by division. The parameters (h+1) and (g+1) can be obtained by dividing the first and third ones of the three obtained areas by the second one.

Other parameters a, b, c, d, e, and f can immediately be calculated by substituting the parameters (g+1) and (h+1) obtained by the above calculations and the coordinate data of the feature points into equation (5). Therefore, it is possible to obtain the homography matrix $H_2$ representing mapping from the unit square of the reference coordinates to the feature points in image 2.

By performing the same processing by using the feature points in image 1, it is possible to obtain the homography matrix $H_1$ representing mapping from the unit square of the reference coordinates to the feature points in image 1. The homography matrix $H_1^{-1}$ for inverse transformation is obtained by calculating an inverse matrix of the homography matrix $H_1$.

Finally, the homography matrix $H_{21}$ to be finally obtained is calculated from the two homography matrices $H_1^{-1}$ and $H_2$ obtained as described above by inversely transforming $H_2$ by $H_1$ based on equation (3).

Figure 3:
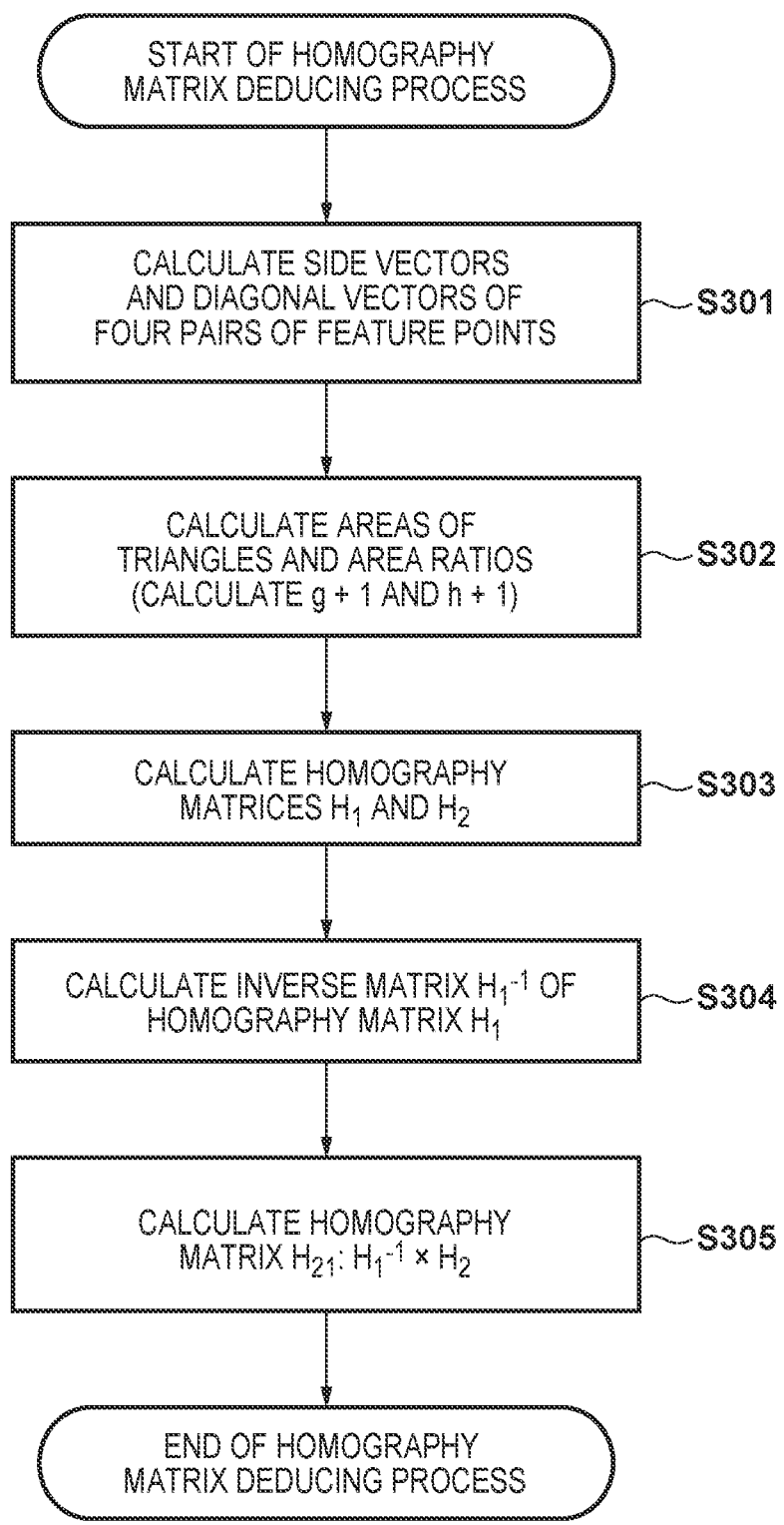
FIG. 3 is a flowchart showing a procedure of the first embodiment.

By using the various properties explained so far, the process of deducing the homography matrix from image 1 to image 2 performed by the blurring detector 808 will be explained with reference to a flowchart shown in FIG. 3.

In step S301, side vectors and diagonal vectors are calculated from the coordinates of the four pairs of feature points in images 1 and 2. These vectors are used in the calculations of g+1 and h+1 in the following stage. In step S302, g+1 and h+1 are calculated based on the calculation formulas of equation (6). As described previously, these values are equivalent to the area ratios of the triangles formed by the feature points. In step S303, the components of the homography matrices $H_1$ and $H_2$ are calculated based on equation (5).

In step S304, the inverse matrix $H_1^{-1}$ of the homography matrix $H_1$ is calculated. In step S305, the homography matrix $H_2$ calculated in step S303 is inversely transformed by using the inverse matrix $H_1^{-1}$ of the homography matrix $H_1$, thereby calculating the homography matrix $H_{21}$ from image 1 to image 2.

In the first embodiment as explained above, the arithmetic operation amount can be reduced from that of the conventional processing by using the area of a triangle whose apexes are three out of four feature points. Accordingly, matrix deduction can be performed for a combination of many corresponding points (a combination of four feature points of feature points in image 1 and four feature points of feature points in image 2) within one frame time. That is, it is possible to deduce a homography matrix having a higher evaluation. In addition, projective transformation of a three-dimensional space can be implemented by an extremely simple calculation by using the idea of this embodiment.

Second Embodiment

When three arbitrary feature points of four feature point coordinates are arranged on a straight line, a homography matrix cannot correctly be deduced any longer because of its properties. Therefore, the linearity of selected feature points is determined, and, if it is determined that the feature points have linearity, homography matrix deduction using the selected feature points is aborted. Consequently, a deducing process time after that can effectively be used in a homography matrix deducing process for other feature points. The second embodiment discloses a method of implementing this linearity determination with almost no additional processing.

As disclosed in the first embodiment, equation (6) shows that g+1 and h+1 are respectively the area ratios $\Delta Q_0Q_2Q_3/\Delta Q_1Q_2Q_3$ and $\Delta Q_1Q_2Q_0/\Delta Q_1Q_2Q_3$ of triangles formed by the feature points. From this property, the linearity of feature points can easily be determined by using the area value of each triangle calculated during the process of obtaining the above area ratios. That is, whether three points are arranged on a straight line can be determined by determining whether the area of a triangle defined by the three points is less than a predetermined threshold (a sufficiently small value). If the area is less than the threshold, it is determined that the three points forming the triangle have linearity, and a matrix deducing process after that is aborted.

Figure 4:
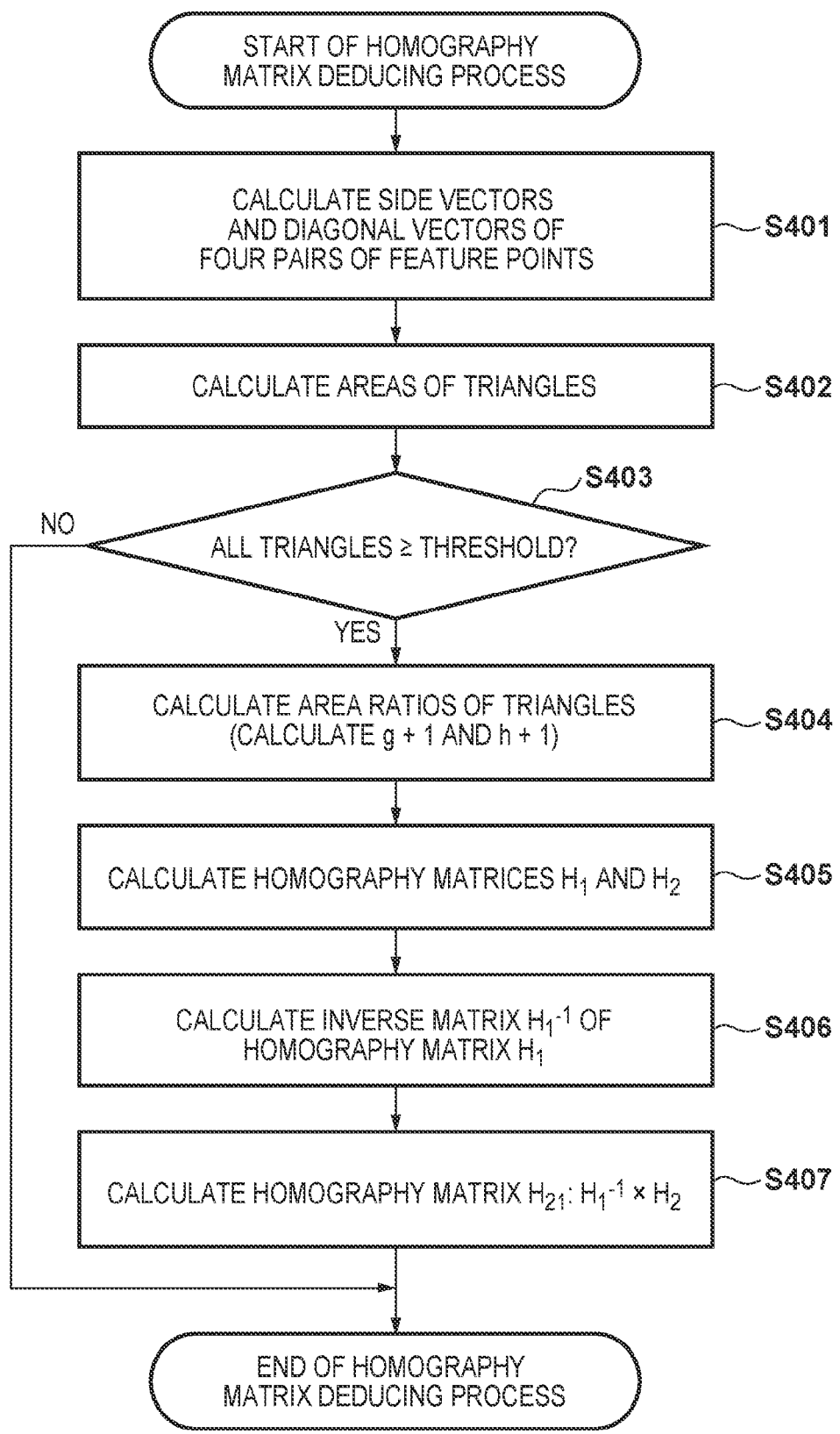
FIG. 4 is a flowchart showing a procedure of the second embodiment.

This operation procedure will be explained with reference to a flowchart shown in FIG. 4. Note that the apparatus configuration is the same as that of the first embodiment, and the relationship between images 1 and 2 is also the same as that of the first embodiment.

In step S401, side vectors and diagonal vectors are calculated from the four pairs of feature points in images 1 and 2. These vectors are used in the calculations of the areas of triangles. In step S402, the areas of the triangles formed by the feature points are calculated.

In step S403, whether the calculated areas of all the triangles are equal to or larger than the predetermined threshold is determined. If there is a triangle whose area is less than the threshold, the matrix deducing process is aborted.

In step S404, the area ratios of the calculated triangles are calculated. This step is equivalent to obtaining g+1 and h+1. In step S405, the components of homography matrices $H_1$ and $H_2$ are calculated based on equation (5). In step S406, an inverse matrix $H_1^{-1}$ of the homography matrix $H_1$ is calculated. In step S407, the homography matrix $H_2$ calculated in step S405 is inversely transformed by using the inverse matrix $H_1^{-1}$ of the homography matrix $H_1$, thereby calculating a homography matrix $H_{21}$ from image 1 to image 2.

As described above, the area as a geometrical feature amount of the coordinates of feature points is calculated. By using this area, it is possible to calculate main parameters of a homography matrix, and readily determine the linearity of the feature points. As a consequence, a homography matrix having a higher evaluation can be deduced. Also, in the second embodiment, the linearity can easily be determined by using the area of the triangle. When compared to the first embodiment, therefore, an unnecessary matrix deducing process can be aborted in an early stage. Consequently, it is possible to perform matrix deduction for a combination of more corresponding points within one frame time.

Third Embodiment

The third embodiment shows an example in which the present invention is applied to a three-dimensional space, and a projective transformation matrix P from space 1 to space 2 is obtained.

As in the first embodiment, a three-dimensional projective transformation matrix P can be decomposed into a projective transformation matrix $P_1^{-1}$ representing mapping from feature points in space 1 to reference coordinates, and a projective transformation matrix $P_2$ representing mapping from the reference coordinates to feature points in space 2. The reference coordinates for obtaining the three-dimensional projective transformation matrix are five apexes of a unit cube in three-dimensional coordinates.

Figure 5:
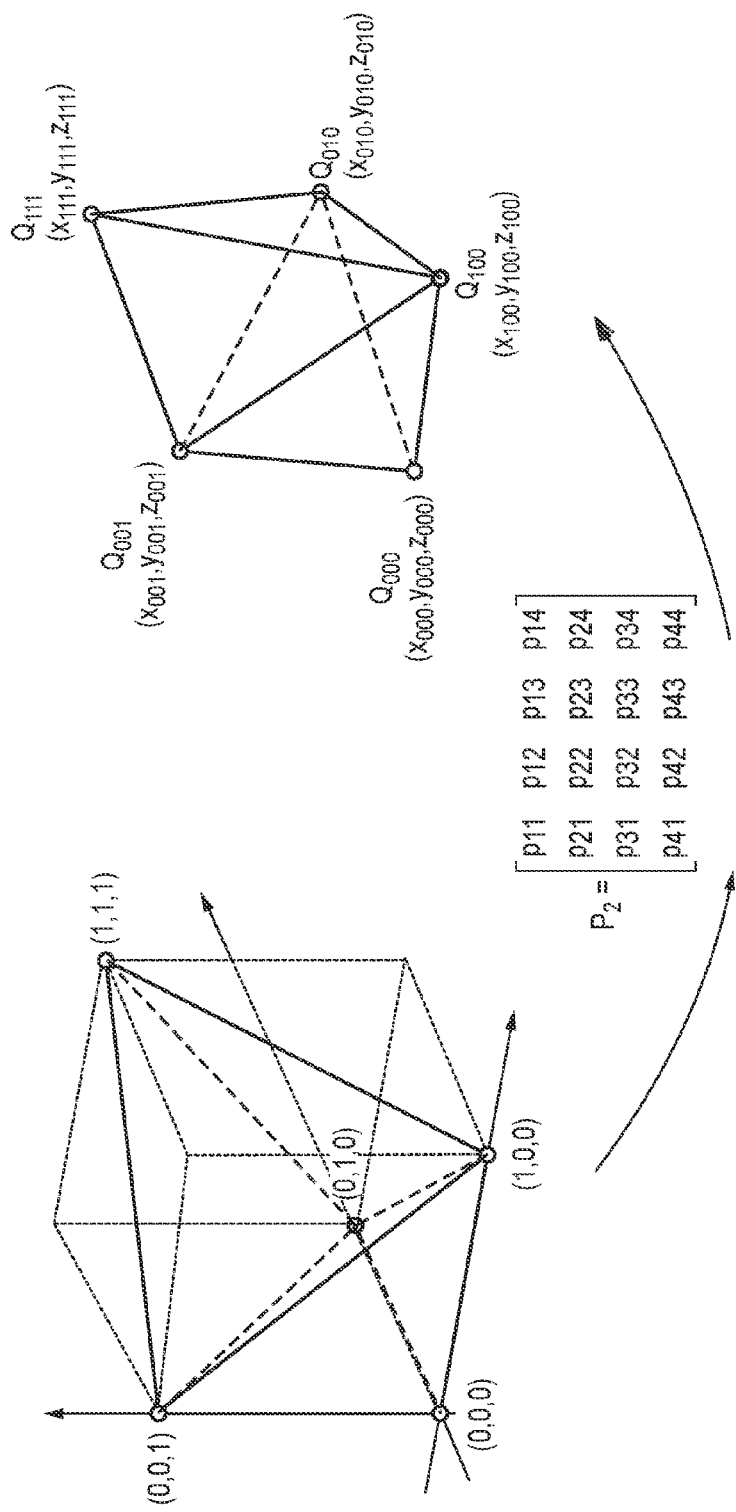
FIG. 5 is a view showing mapping from a tetrahedron of the reference coordinates to feature points in space 2.

First, therefore, the calculation of the projective transformation matrix $P_2$ representing mapping from the five apexes of the unit cube to the feature points in space 2 as shown in FIG. 5 will be explained.

An origin (0, 0, 0) and fourth unit coordinates (1, 0, 0), (0, 1, 0), (0, 0, 1), and (1, 1, 1) are determined in a reference space, and five feature points and coordinates in space 2, which are associated with the origin and four unit coordinates, are expressed as follows:

$Q_{000}(x_{000}, y_{000}, z_{000})$ $Q_{100}(x_{100}, y_{100}, z_{100})$ $Q_{010}(x_{010}, y_{010}, z_{010})$ $Q_{001}(x_{001}, y_{001}, z_{001})$ $Q_{111}(x_{111}, y_{111}, z_{111})$

In this case, simultaneous equations with 15 unknowns for obtaining the projective transformation matrix P are as indicated by equation (7) below, and the relational expression of the matrix components of the projective transformation matrix obtained therefrom is as indicated by equation (8) below:

$$\begin{bmatrix} 0 & 0 & 0 & 1 & 0 & 0 & 0 & 0 & 0 & \dots \\ 1 & 0 & 0 & 1 & 0 & 0 & 0 & 0 & 0 & \dots \\ 0 & 1 & 0 & 1 & 0 & 0 & 0 & 0 & 0 & \dots \\ 0 & 0 & 1 & 1 & 0 & 0 & 0 & 0 & 0 & \dots \\ 1 & 1 & 1 & 1 & 0 & 0 & 0 & 0 & 0 & \dots \\ 0 & 0 & 0 & 0 & 0 & 0 & 0 & 1 & 0 & \dots \\ 0 & 0 & 0 & 0 & 1 & 0 & 0 & 1 & 0 & \dots \\ 0 & 0 & 0 & 0 & 0 & 1 & 0 & 1 & 0 & \dots \\ 0 & 0 & 0 & 0 & 0 & 0 & 1 & 1 & 0 & \dots \\ 0 & 0 & 0 & 0 & 1 & 1 & 1 & 1 & 0 & \dots \\ 0 & 0 & 0 & 0 & 0 & 0 & 0 & 0 & 0 & \dots \\ \dots & 0 & 0 & 0 & 0 & 0 & \dots & 0 & 1 & \dots \end{bmatrix} \begin{bmatrix} p_{11} \\ p_{12} \\ p_{13} \\ p_{14} \\ \dots \\ \dots \\ \\ \\ \dots \\ p_{41} \\ p_{42} \\ p_{43} \end{bmatrix} = \begin{bmatrix} x_{000} \\ x_{100} \\ x_{010} \\ x_{001} \\ x_{111} \\ y_{000} \\ y_{100} \\ y_{010} \\ y_{010} \\ y_{010} \\ z_{000} \\ \dots \end{bmatrix} \quad (7)$$

-continued $$p_{14} = x_{000} \quad (8)$$
$$p_{11} + p_{14} = (p_{41} + 1)x_{100}$$
$$p_{12} + p_{14} = (p_{42} + 1)x_{010}$$
$$p_{13} + p_{14} = (p_{43} + 1)x_{001}$$
$$p_{11} + p_{12} + p_{13} + p_{14} = $$
$$(p_{41} + 1)x_{111} + (p_{42} + 1)x_{111} + (p_{43} + 1)x_{111} - 2x_{111}$$

$$\therefore$$

$$(p_{41} + 1)(x_{100} - x_{111}) + (p_{42} + 1)(x_{010} - x_{111}) + (p_{43} + 1)(x_{001} - x_{111}) = $$
$$2(x_{000} - x_{111})$$
$$(p_{41} + 1)(y_{100} - y_{111}) + (p_{42} + 1)(y_{011} - y_{111}) + $$
$$(p_{43} + 1)(y_{001} - y_{111}) = 2(y_{000} - y_{111})$$
$$(p_{41} + 1)(z_{100} - z_{111}) + (p_{42} + 1)(z_{011} - z_{111}) + (p_{43} + 1)(z_{001} - z_{111}) = $$
$$2(z_{000} - z_{111})$$

The greatest feature of the projective transformation matrix deducing process according to the third embodiment is that when calculating parameters by using equation (8), parameters $p_{41}$, $p_{42}$, and $p_{43}$ are not directly obtained, but calculated as $p_{41}+1$, $p_{42}+1$, and $p_{43}+1$ as indicated by equation (9) below obtained by deforming equation (8). This deformation can simplify the calculation formulas, and reduce the operation amount of the calculation process. The values of $p_{41}+1$, $p_{42}+1$, and $p_{43}+1$ are the volume ratios of tetrahedrons formed by the four feature points.

$$p_{41} + 1 = 2 \frac{\begin{vmatrix} x_{000} - x_{111} & x_{010} - x_{111} & x_{001} - x_{111} \\ y_{000} - y_{111} & y_{010} - y_{111} & y_{001} - y_{111} \\ z_{000} - z_{111} & z_{010} - z_{111} & z_{001} - z_{111} \end{vmatrix}}{\begin{vmatrix} x_{100} - x_{111} & x_{010} - x_{111} & x_{001} - x_{111} \\ y_{100} - y_{111} & y_{010} - y_{111} & y_{001} - y_{111} \\ z_{100} - z_{111} & z_{010} - z_{111} & z_{001} - z_{111} \end{vmatrix}}, \quad (9)$$

$$p_{42} + 1 = 2 \frac{\begin{vmatrix} x_{100} - x_{111} & x_{000} - x_{111} & x_{001} - x_{111} \\ y_{100} - y_{111} & y_{000} - y_{111} & y_{001} - y_{111} \\ z_{100} - z_{111} & z_{000} - z_{111} & z_{001} - z_{111} \end{vmatrix}}{\begin{vmatrix} x_{100} - x_{111} & x_{010} - x_{111} & x_{001} - x_{111} \\ y_{100} - y_{111} & y_{010} - y_{111} & y_{001} - y_{111} \\ z_{100} - z_{111} & z_{010} - z_{111} & z_{001} - z_{111} \end{vmatrix}},$$

$$p_{43} + 1 = 2 \frac{\begin{vmatrix} x_{100} - x_{111} & x_{010} - x_{111} & x_{000} - x_{111} \\ y_{100} - y_{111} & y_{010} - y_{111} & y_{000} - y_{111} \\ z_{100} - z_{111} & z_{010} - z_{111} & z_{000} - z_{111} \end{vmatrix}}{\begin{vmatrix} x_{100} - x_{111} & x_{010} - x_{111} & x_{001} - x_{111} \\ y_{100} - y_{111} & y_{010} - y_{111} & y_{001} - y_{111} \\ z_{100} - z_{111} & z_{010} - z_{111} & z_{001} - z_{111} \end{vmatrix}},$$

After that, as in the first embodiment, a projective transformation matrix $P_1$ from the unit cube to space 1 is obtained, and the matrix product of the inverse matrix $P_1^{-1}$ and projective transformation matrix $P_2$ is calculated. Consequently, the three-dimensional projective transformation matrix P from space 1 to space 2 is obtained.

Figure 6:
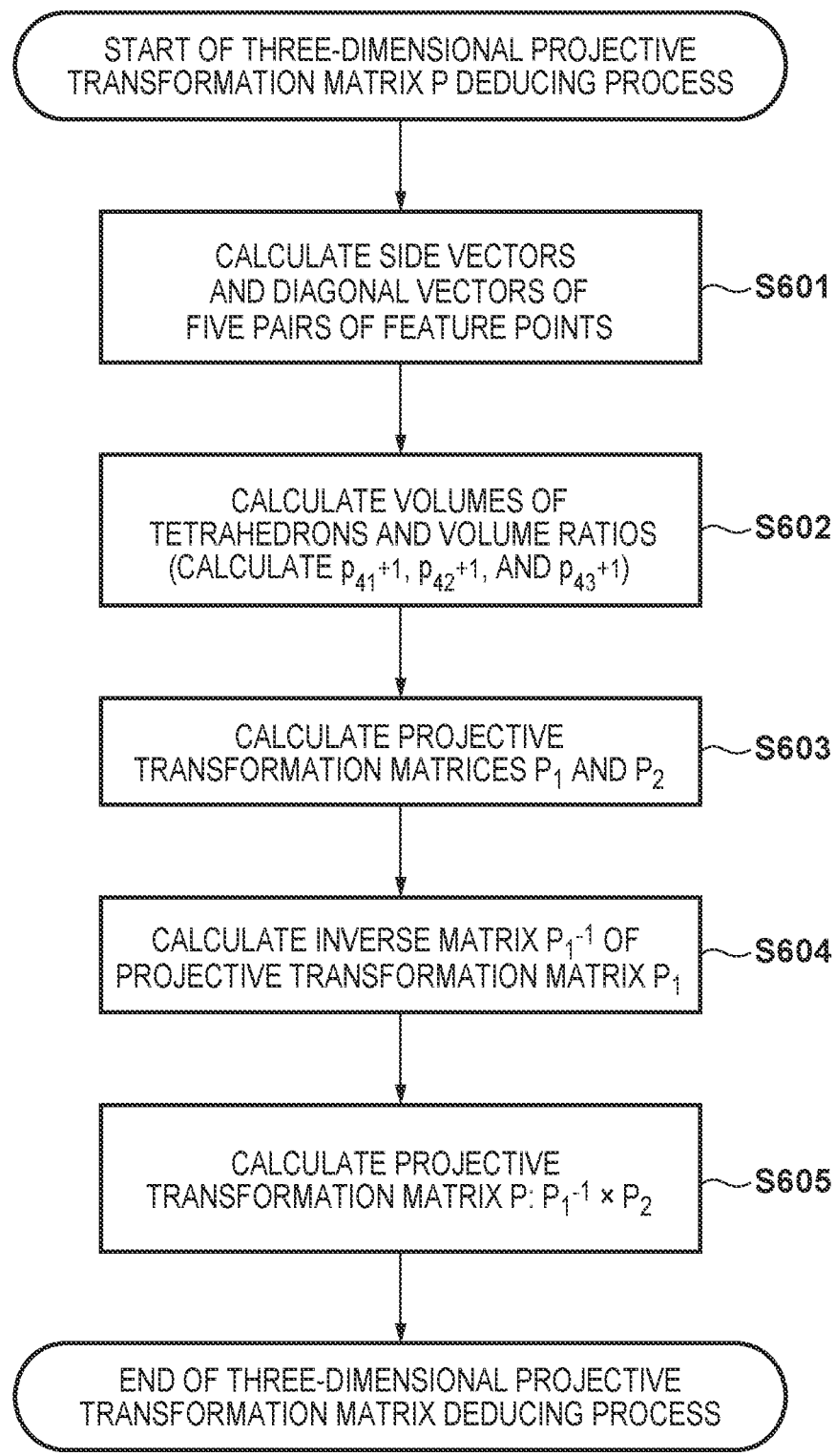
FIG. 6 is a flowchart showing a procedure of the third embodiment.

The operation of deducing the three-dimensional projective transformation matrix from space 1 to space 2 explained so far will be explained with reference to a flowchart shown in FIG. 6.

In step S601, side vectors and diagonal vectors are calculated from the coordinates of five pairs of feature points in spaces 1 and 2. These vectors are used in the calculations of $p_{41}+1$, $P_{42}+1$, and $p_{43}+1$ in the following stage.

In step S602, $p_{41}+1$, $p_{42}+1$, and $p_{43}+1$ are calculated based on the calculation formulas of equation (9). As described previously, these values are equivalent to the volume ratios of the tetrahedrons formed by the feature points. In step S603, the components of the projective transformation matrices $P_1$ and $P_2$ are calculated based on equation (8).

In step S604, the inverse matrix $P_1^{-1}$ of the projective transformation matrix $P_1$ is calculated. In step S605, the projective transformation matrix $P_2$ calculated in step S603 is inversely transformed by using the inverse matrix $P_1^{-1}$ of the projective transformation matrix $P_1$, thereby calculating the projective transformation matrix P from space 1 to space 2.

Conventionally, a three-dimensional projective transformation matrix must be calculated by performing many geometrically meaningless arithmetic operations. In this embodiment, however, it is possible to calculate projective component parameters by calculating a volume feature amount from coordinate information of feature points, and calculate a projective transformation matrix by using the parameters and feature point coordinates.

The third embodiment calculates a projective transformation matrix from a three-dimensional space to a three-dimensional space. However, the third embodiment is readily applicable to the calculation of a projective transformation matrix for a space of four dimensions or more by adding unit coordinates of a reference space and feature points in a feature space in accordance with the dimensions of a space.

Fourth Embodiment

In the above-described third embodiment, if four arbitrary points of the five feature point coordinates exist on the same plane, the three-dimensional projective transformation matrix cannot correctly be deduced because of its properties. Therefore, the planarity of selected feature pints is determined, and, if it is determined that the feature points have planarity, projective transformation matrix deduction is aborted. This makes it possible to effectively use the time of the deducting process after that. The fourth embodiment shows that this planarity determination can be implemented with almost no additional processing.

As disclosed in the third embodiment, $p_{41}+1$, $p_{42}+^1$, and $p_{43}+1$ are the volume ratios of tetrahedrons formed by feature points from equation (9). Based on this property, the planarity of feature points can easily be determined by using the volume value of each tetrahedron calculated during the process of obtaining the abovementioned volume ratios. That is, if the volume of the tetrahedron is less than a predetermined threshold, it is possible to determine that four points forming the tetrahedron have planarity, and abort the matrix deducing process after that.

Figure 7:
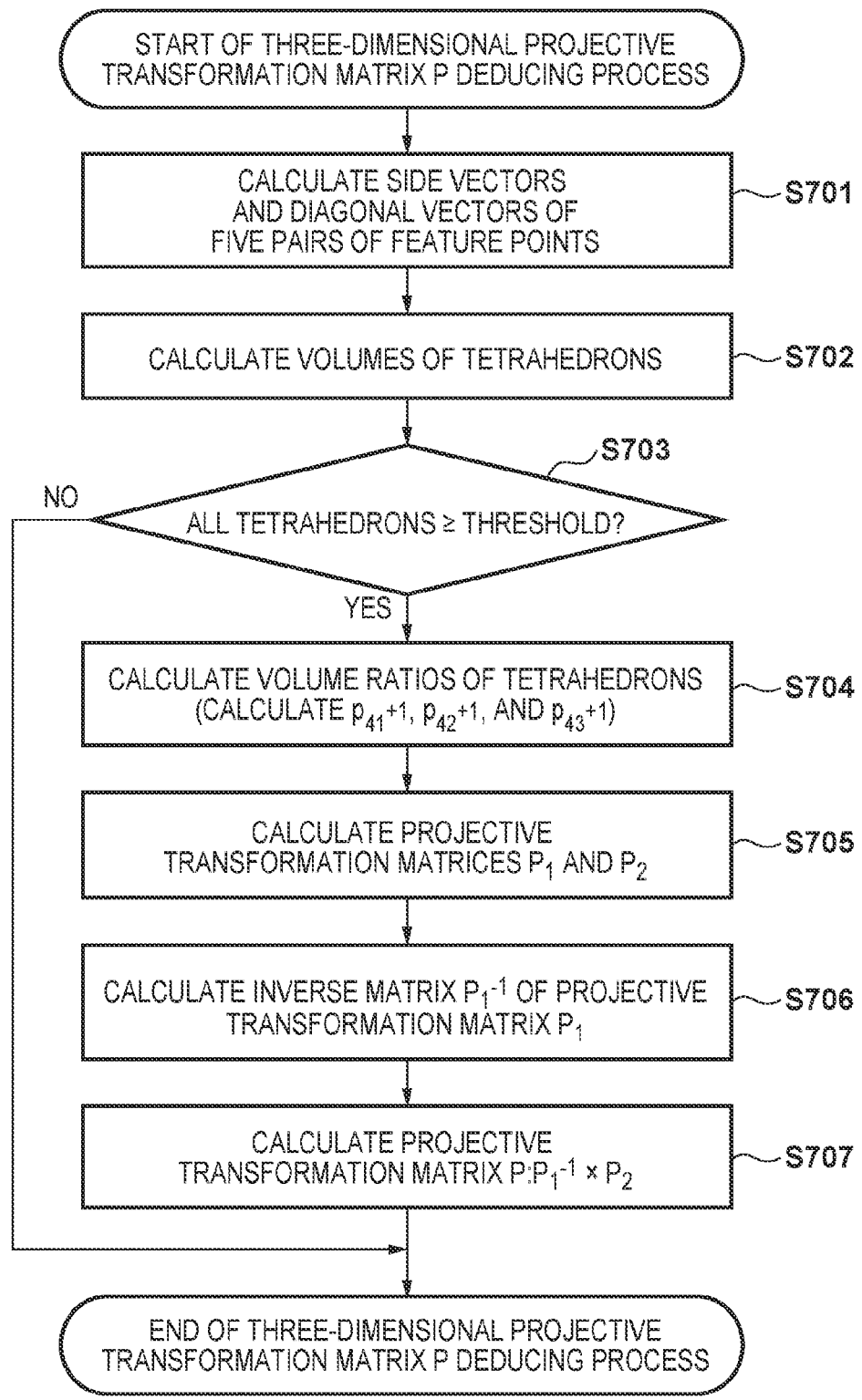
FIG. 7 is a flowchart showing a procedure of the fourth embodiment.

This operation procedure will be explained with reference to a flowchart shown in FIG. 7.

In step S701, side vectors and diagonal vectors are calculated from the coordinates of five pairs of feature points in spaces 1 and 2. These vectors are used in the calculations of the volumes of tetrahedrons.

In step S702, the volumes of the tetrahedrons formed by the feature points are calculated. In step S703, whether the calculated volumes of all the tetrahedrons are equal to or larger than the predetermined threshold is determined. If there is a tetrahedron whose volume is less than the threshold, the matrix deducing process is aborted.

In step S704, the volume ratios of the calculated tetrahedrons are calculated. This step is equivalent to obtaining $p_{41}+1$, $p_{42}+1$, and $p_{43}+1$. In step S705, the components of projective transformation matrices $P_1$ and $P_2$ are calculated based on equation (8). In step S706, an inverse matrix $P_1^{-1}$ of the projective transformation matrix $P_1$ is calculated. In step S707, the projective transformation matrix $P_2$ calculated in step S705 is inversely transformed by using the inverse matrix $P_1^{-1}$ of the projective transformation matrix $P_1$, thereby calculating a three-dimensional projective transformation matrix P from space 1 to space 2.

As described above, it is found that main parameters of the parameter matrix have a close relationship with the volume as a geometrical feature amount obtained from the coordinates of feature points. This makes it possible to easily implement planarity determination. As a consequence, a three-dimensional projective transformation matrix having a higher evaluation can be deduced.

Lastly, a normalization process omitted in the explanation of each embodiment will be described. In each embodiment, the value of the lower right element in the calculated homography matrix or three-dimensional projective transformation matrix is generally not "1". To set the value of this element to "1", the whole matrix is divided by the value of the lower right element, or multiplied by the reciprocal. This is the normalization process, and the process need only be performed when necessary.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-001886, filed Jan. 7, 2015 which is hereby incorporated by reference herein in its entirety.

What is claimed is:

1. An information processing apparatus for estimating a projective transformation from a first frame image in a moving image to a second frame image in the moving image, the second frame image corresponding to the first frame image, the information processing apparatus comprising:
   one or more processors; and
   at least one memory coupled to the one or more processors, the at least one memory having instructions stored thereon which, when executed by the one or more processors, cause the information processing apparatus to:
   calculate, in each of the first frame image and the second frame image, an area of a triangle whose apexes are three feature points of four feature points;
   calculate, in each of the first frame image and the second frame image, a first transformation matrix and a second transformation matrix for transforming four reference feature points into the four feature points, by using the area of the triangle whose apexes are three feature points of the four feature points; and
   calculate the projective transformation from the first frame image to the second frame image as a third transformation matrix for transforming the four feature points of the first frame image into the four feature points of the second frame image, by using the first transformation matrix and the second transformation matrix.

2. The apparatus according to claim 1, wherein calculating the third transformation matrix includes multiplying the second transformation matrix by an inverse matrix of the first transformation matrix.

3. The apparatus according to claim 1, wherein the four reference feature points are apexes of a unit square having an origin as one apex.

4. The apparatus according to claim 1, the memory further having stored thereon instructions that, when executed by the processor, cause the processor to determine whether the three feature points are arranged on the same straight line, wherein if the three feature points are arranged on the same straight line, calculation of the first transformation matrix and the second transformation matrix aborts the calculation using the area of the triangle whose apexes are the three feature points.

5. The apparatus according to claim 4, wherein determining whether the three feature points are arranged on the same straight line includes comparing the area of the triangle whose apexes are the three feature points with a predetermined threshold.

6. An information processing method for estimating a projective transformation from a first frame image to a second frame image corresponding to the first frame image, the method comprising:
   calculating, in each of the first frame image and a second frame image, an area of a triangle whose apexes are three feature points of four feature points;
   calculating, in each of the first frame image and the second frame image, a first transformation matrix and a second transformation matrix for transforming four reference feature points into the four feature points, by using the area of the triangle whose apexes are three feature points of the four feature points; and calculating the projective transformation from the first frame image to the second frame image as a third transformation matrix for transforming the four feature points of the first frame image into the four feature points of the second frame image, by using the first transformation matrix and the second transformation matrix.

7. A non-transitory computer-readable storage medium storing a program which causes a computer to execute a method for estimating a projective transformation from a first frame image to a second frame image corresponding to the first frame image, the method comprising:

calculating, in each of the first frame image and the second frame image, an area of a triangle whose apexes are three feature points of four feature points;

calculating, in each of the first frame image and the second frame image, a first transformation matrix and a second transformation matrix for transforming four reference feature points into the four feature points, by using the area of the triangle whose apexes are three feature points of the four feature points; and calculating the projective transformation from the first frame image to the second frame image as a third transformation matrix for transforming the four feature points of the first frame image into the four feature points of the second frame image, by using the first transformation matrix and the second transformation matrix.

8. A video camera comprising:

a processor; and a memory having stored thereon instructions that, when executed by the processor, cause the processor to:

capture a moving image including a plurality of frame images; and detect, for a first frame image in the moving image, a blurring amount of a second frame image following the first frame image, wherein detecting includes:

calculating, in each of the first frame image and the second frame image, an area of a triangle whose apexes are three feature points of four feature points;

calculating, in each of the first frame image and the second frame image, a first transformation matrix and a second transformation matrix for transforming four reference feature points into the four feature points, by using the area of the triangle whose apexes are three feature points of the four feature points; and calculating a projective transformation from the first frame image to the second frame image as a third transformation matrix for transforming the four feature points of the first frame image into the four feature points of the second frame image, by using the first transformation matrix and the second transformation matrix.

* * * * *